United States Patent [19]

Knödel et al.

[11] Patent Number: 4,836,348
[45] Date of Patent: Jun. 6, 1989

[54] SYNCHRONIZING MECHANISM FOR SHIFTING CLUTCHES

[75] Inventors: Gunter Knödel, Mühlacker; Helga Henzler, Murr, both of Fed. Rep. of Germany

[73] Assignee: Getrag Getriebe und Zahnradfabrik GmbH, Ludwigsburg, Fed. Rep. of Germany

[21] Appl. No.: 68,847

[22] Filed: Jun. 30, 1987

[30] Foreign Application Priority Data

Jul. 4, 1986 [DE] Fed. Rep. of Germany ....... 3622464

[51] Int. Cl.[4] ............................................. F16D 23/06
[52] U.S. Cl. ..................................... 192/53 F; 74/339; 192/114 T
[58] Field of Search ................ 192/53 R, 53 F, 53 G, 192/114 T; 74/339

[56] References Cited

U.S. PATENT DOCUMENTS

| 2,397,943 | 4/1946 | Bull | 192/53 F |
| 3,110,191 | 11/1963 | Schulze | 192/53 F X |
| 3,548,983 | 12/1970 | Hiraiwa | 192/53 |
| 3,860,101 | 1/1975 | De Feo | 192/53 |
| 4,189,041 | 2/1980 | Müller | 192/53 F |

FOREIGN PATENT DOCUMENTS

| 0144962 | 12/1984 | European Pat. Off. |
| 2659448 | 8/1978 | Fed. Rep. of Germany |
| 2043806 | 2/1980 | United Kingdom |

Primary Examiner—Allan D. Herrmann
Attorney, Agent, or Firm—Helfgott & Karas

[57] ABSTRACT

A synchronizing mechanism for clutches comprises a gearshift sleeve provided with locking teeth coacting with locking teeth of a synchronizer ring and with separate coupling teeth coacting with the coupling teeth of clutch bodies. The locking teeth of the gearshift sleeve are provided with undercuts whose flanks exhibit substantially the same angle relative to a longitudinal axis of the teeth as the wedge surfaces formed on the ends of the coupling teeth of the clutch bodies. Once synchronism has been reached, these undercuts enable the unit formed by the clutch body and the synchronizer ring to be rotated relative to the gearshift sleeve so that the coupling teeth of the gearshift sleeve can be introduced without any resistance between the coupling teeth of the clutch body.

6 Claims, 3 Drawing Sheets

SYNCHRONIZING MECHANISM FOR SHIFTING CLUTCHES

BACKGROUND OF THE INVENTION

The present invention relates to a synchronizing mechanism for clutches, in particular for manual gearboxes for motor vehicles, comprising a guide sleeve fixed to a shaft and provided with an external toothing, a gear which is rotatably seated on the shaft beside the said guide sleeve and provided with a clutch body having coupling teeth forming an external toothing, the said clutch body being fastened to the said gear to rotate therewith, further a gearshift sleeve surrounding the guide sleeve and provided with an inner toothing which is in engagement with the outer toothing of the guide sleeve and which comprises coupling teeth that can be brought into engagement with the external toothing of the coupling body by axial displacement of the gearshift sleeve, a synchronizer ring provided between the guide sleeve and the coupling body, the said synchronizer ring engaging, in the circumferential direction, the gearshift sleeve in form-locking relationship and the clutch body in frictional relationship and carrying on its circumference locking teeth coacting with locking teeth that belong to the internal toothing of the gearshift sleeve and exhibit an axial length smaller than the length of the coupling teeth, and wedge surfaces provided at the ends of all teeth facing each other, the wedge surfaces of the locking teeth being in contact with each other when no synchronism exists so as to prevent in this manner the coupling teeth from engaging each other as long as synchronism has not been reached.

A synchronizing mechanism of this type has been known before from German Patent Specification No. 26 59 448. The use of different teeth for locking the gearshift sleeve as long as synchronism has not been reached and for establishing the form-locking engagement between the gearshift sleeve and the gear to be engaged (change gear), enables very short shifting travels to be reached without impairing the safety of the shifting operation. When during the shifting operation the speed of the shaft and of the change gear have been adapted to each other, as a result of the synchronizer ring being urged against the clutch body and the moment of friction exerted thereby, and when the moment of friction breaks down suddenly when synchronism is reached, then the gearshift sleeve can rotate the synchronizer ring and the change gear relative to the gearshift sleeve, due to the wedge surfaces provided at the ends of its locking teeth and coacting with the wedge surfaces at the ends of the locking teeth of the synchronizer ring, until the locking teeth of the gearshift sleeve face the gaps between the locking teeth of the synchronizer ring so that the gearshift sleeve can be displaced across the synchronizer ring until the coupling teeth of the gearshift sleeve come to engage the coupling teeth of the clutch body. Considering that the angular position of the synchronizer ring relative to the clutch body is undefined, the coupling teeth of the gearshift sleeve will normally not face the gaps between the coupling teeth of the clutch body so that the coupling teeth will come to bear against each other by their—more or less overlapping—wedge surfaces and any further axial displacement of the gearshift sleeve will be possible only if a rotary movement occurs between the synchronizer ring and the clutch body, i.e. when the frictional engagement between the synchronizer ring and the change gear is released. This necessity to unlock the two elements leads to a certain resistance during engagement of the gear, which makes itself felt unfavorably in the form of a second pressure point at the end of the shifting travel.

SUMMARY OF THE INVENTION

Now, it is the object of the present invention to improve a synchronizing mechanism for manual gearboxes of the type described above in such a manner that no additional pressure point is encountered and has to be overcome during shifting when engaging a gear after synchronism has been reached and, thus, the moment of friction has broken down.

This object is achieved according to the invention by an arrangement in which both the locking teeth provided on the synchronizer ring and the locking teeth on the gearshift sleeve are undercut directly adjacent their wedge surfaces, relative to the axial direction, at an angle at least equal to the angle of the wedge surfaces provided at the ends of the coupling teeth of the clutch body and the gearshift sleeve.

Once synchronism has been reached and the moment of friction has broken down, the undercuts provided on the locking teeth of the gearshift sleeve and the synchronizer ring enable the gearshift sleeve and the synchronizer ring to be rotated relative to each other to the same extent in which rotary movement occurs between the change gear and the gearshift sleeve due to the sliding movement of the wedge surfaces provided at the ends of the coupling teeth, without the need to release once more the frictional engagement between the synchronizer ring and the change gear. This rotary movement between the change gear and the gearshift sleeve takes place practically without any resistance, once the moment of friction has broken down, so that no additional releasing action is required for completing the shifting operation and, consequently, no second pressure point can occur at the end of the shifting operation.

Considering that the locking teeth serve synchronization purposes only and do not have to transmit the operating torque, it is desirable that the number of coupling teeth be selected as great as possible and, conversely, the number of locking teeth be reduced to a minimum. Accordingly, one embodiment of the invention provides that a plurality, preferably three, individual locking teeth are arranged about the periphery of the gearshift sleeve, with each locking tooth coacting with a pair of locking teeth provided around the periphery of the synchronizer ring.

The synchronizing mechanism designed according to the invention further enables the wedge surfaces on the locking and coupling teeth to be optimally adapted to the given operating conditions. While, normally, the wedge surfaces of all teeth have the same inclination relative to the longitudinal axis of the teeth, it is provided according to one preferred embodiment of the invention that the wedge surfaces of the locking teeth are less steep relative to the axial direction than the wedge surfaces of the coupling teeth. Due to the flatter wedge surfaces on the coupling teeth, the axial portion of the force applied during shifting and serving to achieve synchronism is particularly high—which supports rapid synchronization and reduces the force required for effecting the shifting operation—while the steeper angles of the coupling teeth ensure particular easy rotation of the coupling teeth to be brought into engagement after the moment of friction has broken down. In order to achieve perfect synchronization and control of the forces encountered during the synchronization process, it may be particularly convenient, especially in cases where a few locking teeth are used only, to give the locking teeth a greater extention in the circumferential direction than the coupling teeth.

The invention can be applied regardless of whether the gearshift sleeve serves to establish the rotary connection of the shaft with only a single gear mounted beside the guide sleeve or with one of two gears mounted on both sides of the guide sleeve.

DETAILED DESCRIPTION OF THE PREFERRED EMBODIMENT

Figure 1:
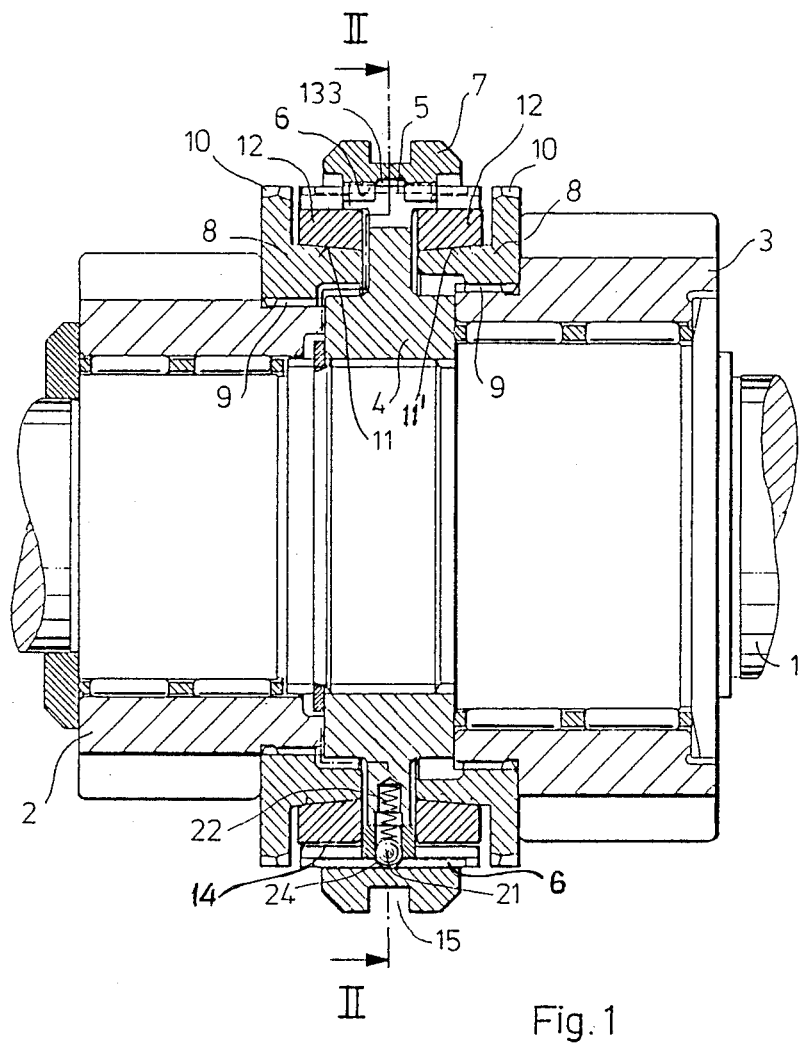
FIG. 1 shows a longitudinal sectional view of a gearbox portion.
Figure 2:
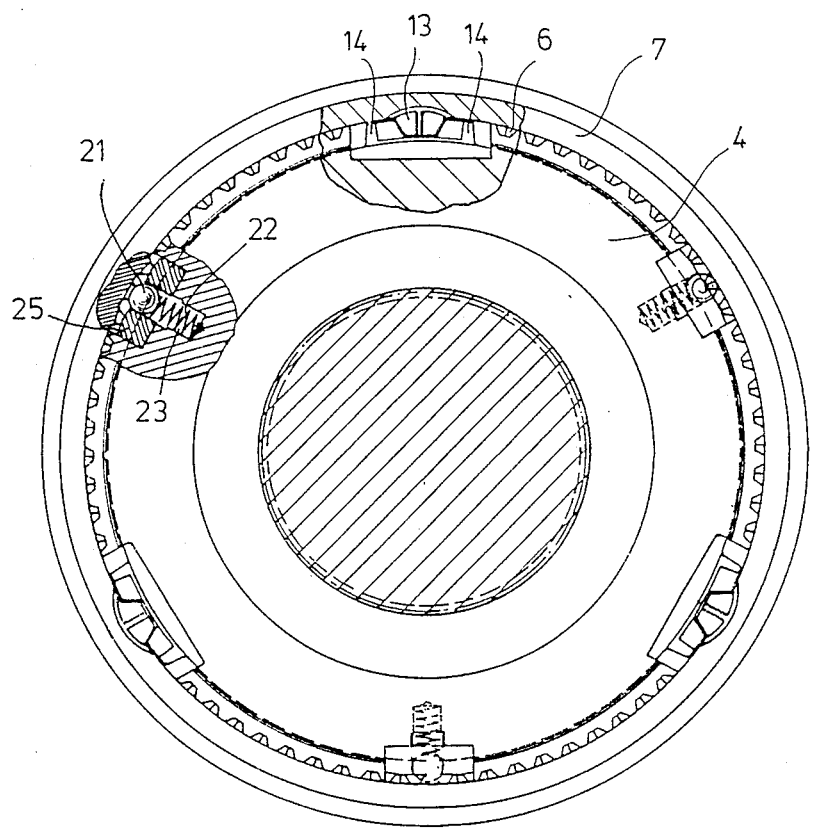
FIG. 2 shows a sectional view along line II—II of FIG. 1.

In the arrangement shown in FIGS. 1 and 2, two gears 2, 3 are seated rotatably in spaced relationship on a gearshaft 1, and are constantly engaged, in a manner not shown in detail, by two gears seated in fixed relationship on a shaft extending parallel to the gearshaft 1. A shifting clutch arranged between the two gears 2, 3 enables the said gears 2, 3 to be selectively brought into rotary engagement with the gearshaft 1 so that the torque exerted upon the gearshaft 1 is transmitted to the parallel shaft by the gear, which is in rotary engagement with the said gearshaft 1, via the shifting clutch, in accordance with the transmission ratio resulting from the ratio of the number of teeth of the gears engaging each other.

The shifting clutch establishing the rotary connection between one of the two gears 2, 3 and the gear shaft 1 comprises a guide sleeve 4 which is fixed against rotation on the gearshaft 1, between the gears 2, 3, and which carries on its circumferential face an external toothing 5 engaged by the internal toothing of a gearshift sleeve 7 surrounding the guide sleeve 4. Each of the gears 2, 3 is provided, on its sides facing the guide sleeve 4, with a clutch body, 8' which is in rotary engagement with the associated gear, for example by means of a serration 9', and which is provided about its circumference with coupling teeth, 10' aligned with the external toothing 5 of the guide sleeve 4 and provided, on a portion of smaller diameter, with a conical surface, 11' supporting a synchronizer ring, 12' provided with a matching conical surface. Each of the synchronizer rings, 12' is provided between the portion of the clutch body carrying the coupling teeth, 10' and the guide sleeve 4 and comprises equally an external toothing which is aligned with the external toothing 5 of the guide sleeve 4 and the coupling teeth, 10' of the clutch body, 8'.

The shifting sleeve 7 is normally retained in a central position by means of stop elements which, in the embodiment shown, consist of balls 21 loaded by compression springs 22 seated in radial bores 23 of the guide sleeve 4. The balls 21 engage a central recess, for example an annular groove 24, of the gearshift sleeve 7. The circumference of the guide sleeve 4 is provided, in the area of the balls 21 and the compression springs 22, with transverse slots accommodating each a thrust piece 25 the ends of which are arranged at a small distance opposite the adjacent end faces of the synchronizer ring 12.

Figure 3:
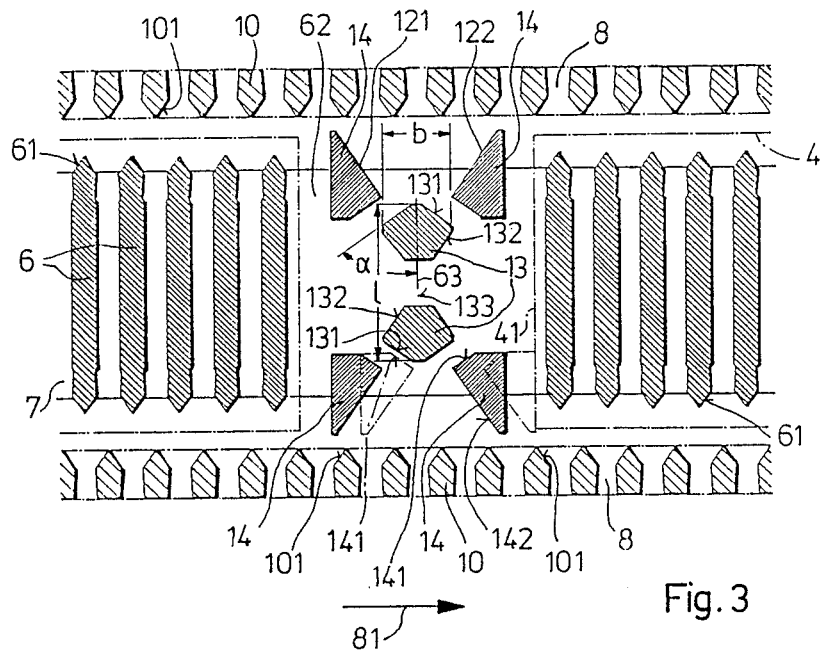
FIGS. 3–5 show sectional views of intermeshing teeth in various positions thereof during a gearshift operation.

In the development view of FIG. 3 one can see the coupling teeth 10 arranged about the circumference of the clutch body 8 and provided on their ends with wedge surfaces 101. The internal toothing of the gearshift sleeve 7 comprises coupling teeth 6 which extend over the full width of the gearshift sleeve and which are also provided on their ends with wedge surfaces 61 having the same inclination as the wedge surfaces 101 of the coupling teeth 10 of the clutch body 8. Between the coupling teeth 6, there are provided three interruptions 62 distributed over the circumference of the shifting clutch. Each of the said interruption areas comprises a locking tooth 13 having an axial length l smaller than the length of the coupling teeth 6. On the other hand, the locking tooth 13 has a width b greater than that of the coupling teeth 6, and the wedge surfaces 131 provided on the ends of the locking tooth 13 are flatter than the wedge surfaces 61 on the coupling teeth 6, which means that the angle α formed between the wedge surfaces 131 and the longitudinal axis 63 is larger than in the case of the coupling teeth 6. Further, the teeth are cut back adjacent the wedge surfaces 131 so that the locking teeth 13 taper again towards the side opposite the wedge surfaces 131. The lateral flanks 132 determining the taper extend parallel to the wedge surfaces 61 at the ends of the coupling teeth 6. As can be further seen in FIG. 3, the tooth 13 is recessed at its central portion in consideration of the intersection between its rear lateral flanks 132 so that a gap 133 separating two tooth portions is formed.

Each of the three locking teeth 13 coacts with two locking teeth 14 on the two synchronizer rings 12' which are arranged before and behind the respective locking tooth 13 of the gearshift sleeve, viewed in the circumferential direction, as shown in FIG. 2. The locking teeth 14 are provided on their ends facing the locking tooth 13 of the gearshift sleeve with wedge surfaces 141 having the same inclination as the wedge surfaces 131 at the ends of the locking tooth 13. Further, the locking teeth 14 provided on the synchronizer rings, 12' are also cut back and, accordingly, provided with flanks 142' adjacent their wedge surfaces 141, the said flanks 142 having the same inclination as the wedge surfaces 61 and 101 at the ends of the locking teeth 6 and 10 and, thus, also as the flanks 132 defining the undercuts on the locking tooth 13 of the gearshift sleeve. The spacing between the two locking teeth 14 of the synchronizer ring 12 associated with one locking tooth 13 of the gearshift sleeve is substantially equal to the extension in the circumferential direction of the locking tooth 13, i.e. equal to the width b, so that the locking tooth 13 can pass the gap formed between the locking teeth 14 on the circumference of the synchronizer rings 12.

In the condition illustrated in FIGS. 1 and 3, the gearshift sleeve 7 is in its neutral position in which neither of the two gears 2, 3 is connected with the gearshaft 1 to rotate therewith. For engaging one of the two gears, the gearshift sleeve 7 must be displaced to the right or to the left, by means of a gearshift fork—not shown in detail—engaging the outer annular groove 15 in order to bring the coupling teeth 6 of the gearshift sleeve 7 into engagement with the coupling teeth 10 on the circumference of the clutch body 8—after synchronism has been reached—and, thus, to establish the form-locking connection with the guide sleeve 4 which is retained on the gearshaft 1 against rotation.

Figure 4:
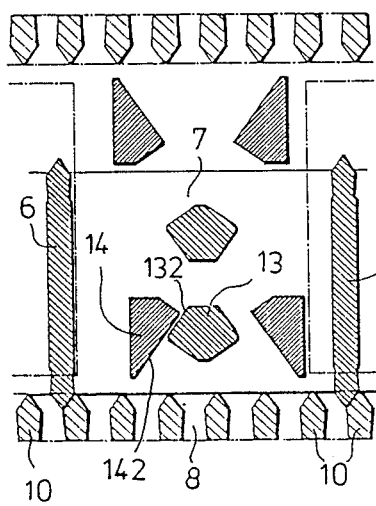
Figure 5:
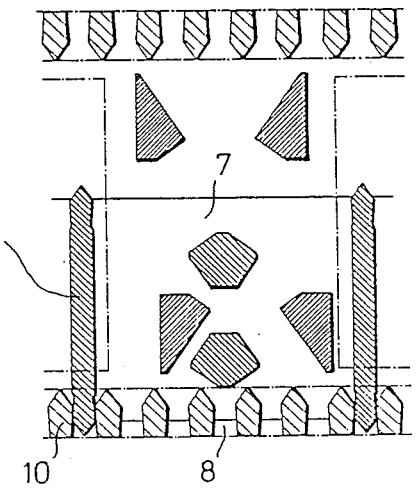

Now, when the gearshift sleeve 7 is moved to the left in FIG. 1, in the direction towards the neighboring gear 2, or downwardly in FIGS. 3 to 5, the thrust piece 25 will come to bear upon the synchronizer ring 12 in the usual manner so that the latter's conical surface will be urged against the corresponding conical surface 11 of the clutch body 8. This establishes a frictional connection between the synchronizer ring 12 and the clutch body 8 due to which the synchronizer ring 12 is entrained in the sense of rotation of the clutch body 8, relative to the guide sleeve 4 and the gearshift sleeve 7, as far as this is permitted by the form-locking engagement existing in the circumferential direction between the synchronizer ring 12 and the guide sleeve 4. In the case of the arrangement shown in FIG. 3, the lower clutch body 8 moves relative to the guide sleeve 4 indicated by the dash-dotted contour in the direction of arrow 81, i.e. to the right, entraining the synchronizer ring 12 by frictional engagement so that the locking teeth 14 provided thereon follow this movement until they come up against a flank 41 of the guide sleeve 4. In the position now reached, the wedge surface 141 of the locking tooth 14 shown on the left side at the bottom of FIG. 3 is arranged opposite the wedge surface 131 of the locking tooth 13 of the gearshift sleeve 7. This position is maintained until synchronism between the two partners is reached due to the frictional engagement between the conical surfaces 11 on the synchronizer ring 12 and on the clutch body 8. As soon as this condition is reached, the moment of friction breaks down suddenly so that the gearshift sleeve 7, with its locking teeth 13, can enter the space between the two locking teeth 14 of the synchronizer ring 12 while rotating the synchronizer ring 12 and the clutch body 8 with the gear 2. In FIG. 4 it can be seen that during continuation of the movement of the gearshift sleeve 7, the ends of its coupling teeth 6 come to hit upon the ends of the coupling teeth 10 of the clutch body 8. Only in very rare cases will the coupling teeth 6 of the gearshift sleeve 7 accidentally face exactly the gaps between the coupling teeth 10 of the clutch body 8 so that they can be introduced between these teeth without any obstruction, as shown in FIG. 5. The position of the coupling teeth 6 of the gearshift sleeve 7, relative to the coupling teeth 10 of the clutch body 8, depends on the momentary angular position reached when synchronism is obtained between the synchronizer ring and the clutch body.

Due to the fact that the synchronizer ring 12, the guide sleeve 4 and the gearshift sleeve 7 are fixed against rotation relative to each other, the relative rotation between the gearshift sleeve 7 and the clutch body 8 that can be brought about forcedly through the wedge surfaces 61 and 101 at the ends of the coupling teeth 6 and 10 could be achieved heretofore only by releasing again the frictional engagement between the synchronizer ring 12 and the clutch body 8. The force required for this purpose made itself felt as a second pressure point at the end of the shifting operation and was regarded as disagreeable. The undercuts provided in the illustrated embodiment of the invention, which are delimited by the flanks 132 and 142 and which exhibit the same inclination as the wedge surfaces 61 and 101 at the ends of the coupling teeth 6 and 10 permit, however, not only the relative rotation between the guide sleeve 4 and the synchronizer ring 12 during release of the locking action, once synchronism has been achieved. Rather, once the wedge surfaces 131, 141 at the locking teeth 13, 14 have moved clear of each other, they also allow, due to the undercuts, repeated rotary movement to the extent required for bringing the toothings formed by the coupling teeth 6, 10 into engagement with each other. FIG. 5 shows the condition in which the coupling teeth 6 of the gearshift sleeve 7 and the coupling teeth 10 of the clutch body 8 have been brought into engagement so that in this position of the gearshift sleeve 7, the gear 2 and the gearshaft 1 are connected to rotate together, due to the form-locking engagement between the gearshift sleeve 7 and the guide sleeve 4.

It appears that no additional pressure point will occur during complete engagement of the gearshift sleeve into the engaged position due to the fact that the synchronizer ring can be rotated after synchronism has been achieved. In combination with the short shifting travels permitted by the synchronizing mechanisms of the species described, this permits extremely smooth and quick shifting.

It is understood that the present invention is not limited to the embodiment described, but that deviations are possible without leaving the scope of the invention. In particular, the invention may be applied also to arrangements in which only one gear can be coupled selectively with a shaft, and the invention is also independent of the number of groups of locking teeth distributed over the circumference of the gearshift sleeve, and independent of the number of locking teeth contained in each group. Accordingly, the invention can be applied with success to gearboxes of the most different structures.

We claim:

1. A synchronizing mechanism for clutches, particularly for manual gearboxes for motor vehicles, comprising:

a rotatable shaft defining an axis;

a guide sleeve fixed to said shaft and being provided with a first external toothing;

a pinion rotatably seated on said shaft adjacent said guide sleeve;

a clutch body rigidly connected to said pinion to rotate therewith and provided with a second external toothing;

a gearshift sleeve surrounding said guide sleeve and provided with an internal toothing engaging said first external toothing; and a synchronizer ring arranged between said guide sleeve and said clutch body, said synchronizer ring engaging circumferentially said gearshift sleeve in a form-locking relationship therewith for allowing its limited rotation and further circumferentially engaging said clutch body in a frictional relationship;

said gearshift sleeve including first coupling teeth provided internally thereon and arranged to be brought into engagement with said second external toothing upon axial displacement of said gearshift sleeve, said first coupling teeth having a first axial length and being provided at their axial ends with first wedge faces inclined at a first angle with respect to said axis;

said second external toothing forming second coupling teeth provided at their axial ends facing said gearshift sleeve with second wedge faces inclined at said first angle with respect to said axis;

said gearshift sleeve including first locking teeth provided internally thereon in a circumferentially offset position with respect to said first coupling teeth and having a second axial length smaller than said first axial length, said first locking teeth being provided with third wedge faces facing towards a first axial direction and being inclined at a second angle with respect to said axis, said first locking teeth being further provided with first cut-back flanks adjacent said third wedge faces, said first cut-back flanks facing towards a second axial direction and extending parallel to said first wedge faces;

said synchronizer ring including second locking teeth provided externally thereon, said second locking teeth having fourth wedge faces facing towards said second axial direction and being inclined at said second angle with respect to said axis, said second locking teeth being further provided with second cut-back flanks adjacent said fourth wedge faces, said second cut-back flanks facing towards said first axial direction and extending parallel to said first wedge faces;

said third wedge faces contacting said fourth wedge faces upon axial displacement of said gearshift sleeve during gearshift until attainment of synchronism with a rigid frictional connection established between said synchronizer ring and said clutch body, said third wedge faces clearing said fourth wedge faces upon further axial displacement of said gearshift sleeve to bring said first and second cut-back flanks in contact with each other and slide on each other until contact of said first and second wedge faces with said frictional connection is still established.

2. Synchronizing mechanism according to claim 1, wherein said wedge surfaces of said locking teeth are less steep relative to the axial direction that said wedge surfaces of said coupling teeth.

3. Synchronizing mechanism according to claim 1, wherein said locking teeth have a greater extension in the circumferential direction than said coupling teeth.

4. Synchronizing mechanism according to claim 1, comprising a plurality of pinions with clutch bodies and synchronizer rings arranged on both sides of the guide sleeve and the gearshift sleeve that can be displaced in both directions relative to said guide sleeve, wherein the locking teeth forming part of said internal toothing of said gearshift sleeve are interrupted by a gap in an area of their centers.

5. Synchronizing mechanism according to claim 1, wherein a plurality of individual locking teeth are arranged about a periphery of said gearshift sleeve, with each locking tooth coacting with a pair of locking teeth provided around said synchronizer ring.

6. Synchronizing mechanism according to claim 5, wherein three individual locking teeth are arranged about the periphery of said gearshift sleeve.

* * * * *